United States Patent
Lau et al.

(10) Patent No.: US 8,415,911 B2
(45) Date of Patent: Apr. 9, 2013

(54) POWER TOOL WITH A DC BRUSH MOTOR AND WITH A SECOND POWER SOURCE

(75) Inventors: James Ching Sik Lau, Hong Kong (CN); Chang Lin Jin, Shenzhen (CN)

(73) Assignee: Johnson Electric S.A., Murten (CH)

( * ) Notice: Subject to any disclaimer, the term of this patent is extended or adjusted under 35 U.S.C. 154(b) by 223 days.

(21) Appl. No.: 12/839,160

(22) Filed: Jul. 19, 2010

(65) Prior Publication Data
US 2011/0012550 A1    Jan. 20, 2011

(30) Foreign Application Priority Data

Jul. 17, 2009 (CN) .......................... 2009 1 0108907
Jul. 23, 2009 (CN) .......................... 2009 1 0108831

(51) Int. Cl.
- H01R 39/42 (2006.01)
- H01R 39/44 (2006.01)
- H02K 13/00 (2006.01)
- H02P 1/16 (2006.01)
- H02P 3/00 (2006.01)

(52) U.S. Cl. ........ 318/541; 318/139; 318/245; 388/803; 388/808; 388/827; 388/838; 388/840; 388/851; 388/859

(58) Field of Classification Search .......... 318/245, 318/541, 139; 388/803, 808, 827, 840, 851, 388/859
See application file for complete search history.

(56) References Cited

U.S. PATENT DOCUMENTS

| 4,237,410 | A  | * | 12/1980 | Erickson et al. ............ 320/126 |
| 4,843,286 | A  | * | 6/1989  | Suriano et al. ............. 318/443 |
| 4,997,237 | A  | * | 3/1991  | Ricker et al. ............. 303/115.2 |
| 5,485,049 | A  | * | 1/1996  | Shannon et al. ........... 310/248 |
| 6,930,457 | B2 | * | 8/2005  | Zack et al. ................ 318/139 |
| 7,161,272 | B2 |   | 1/2007  | Enyedy et al. |
| 2006/0083490 | A1 | * | 4/2006  | Simofi-Ilyes et al. ....... 388/806 |
| 2009/0033159 | A1 |   | 2/2009  | West et al. |
| 2009/0256502 | A1 | * | 10/2009 | Naumann et al. .......... 318/139 |

FOREIGN PATENT DOCUMENTS

| JP | 2002119031 | 4/2002 |
| JP | 2007137162 | 6/2007 |
| JP | 2007143278 | 6/2007 |

* cited by examiner

Primary Examiner — Walter Benson
Assistant Examiner — Erick Glass
(74) Attorney, Agent, or Firm — Muncy, Geissler, Olds & Lowe, PLLC

(57) ABSTRACT

A power tool comprises a housing, a direct current motor arranged in the housing, a speed reduction mechanism coupled to a shaft of the motor, a tool head driven by the speed reduction mechanism, a first direct current power source, and a switching device. The motor comprises a common brush, a high speed brush and a low speed brush which are in sliding contact with a commutator. The switching device is configured to selectively connect the common brush and the high speed brush with the power source to operate the motor in a high speed mode and to connect the common brush and the low speed brush with the power source to operate the motor in a low speed mode.

7 Claims, 5 Drawing Sheets

POWER TOOL WITH A DC BRUSH MOTOR AND WITH A SECOND POWER SOURCE

CROSS REFERENCE TO RELATED APPLICATIONS

This non-provisional patent application claims priority under 35 U.S.C. §119(a) from Patent Application No. 200910108907.9 filed in The People's Republic of China on Jul. 17, 2009 and from Patent Application No. 200910108831.X filed in The People's Republic of China on Jul. 23, 2009.

FIELD OF THE INVENTION

This invention relates to a power tool and in particular, to a power tool having a multi-speed DC motor.

BACKGROUND OF THE INVENTION

Power tools are often required to operate in different speed modes. For example, when a drill driven by a motor is used for drilling holes, high speed operation is required, and when it is used for turning screws, low speed operation is required. Speed control is commonly provided by a speed reduction mechanism such as a planetry gearbox. Multiple stages are provided in the gearbox to achieve the desired maximum speed and minimum speeds. However, adding stages to the gearbox is costly in terms of material and assembly costs and each stage introduces additional losses due to friction etc, which reduces the work time from a single charge of the DC power source (battery).

SUMMARY OF THE INVENTION

Hence there is a desire for a power tool with a motor having an improved range of speed control.

This is achieved in the present invention by using a multi-speed DC motor having at least three brushes.

Accordingly, in one aspect thereof, the present invention provides a power tool comprising: a housing, a direct current motor arranged in the housing, a speed reduction mechanism coupled to a shaft of the motor, a tool head driven by the speed reduction mechanism, a first direct current power source, and a switching device, wherein the motor comprises: a common brush, a high speed brush and a low speed brush which are in sliding contact with a commutator; and wherein the switching device is configured to selectively connect the common brush and the high speed brush with the power source to operate the motor in a high speed mode and to connect the common brush and the low speed brush with the power source to operate the motor in a low speed mode.

Preferably, the power tool further comprises a second power source, wherein the switching device connects predetermined combinations of the power sources to selected brushes to operate the motor in different speed modes.

Preferably, the switching device connects the first and second power sources in series between the common brush and the high speed brush to operate the motor in the high speed mode.

Preferably, the switching device connects the first and second power sources in parallel between the common brush and the low speed brush to operate the motor in the low speed mode.

Preferably, the first and second power sources have the same voltage.

Alternatively, the first and second power sources have different voltages.

Preferably, the power tool further comprises a first resistor, wherein the switching device connects the first power source to the low speed brush via the first resistor to reduce the voltage applied to the low speed brush when the motor is operating in the low speed mode.

Preferably, the power tool further comprises a second resistor, wherein the switching device connects the first power source to the high speed brush via the second resistor to reduce the voltage applied to the high speed brush when the motor is operating in the high speed mode, the resistance of the first resistor being higher than the resistance of the second resistor.

Preferably, the switching device comprises three single pole double throw switches and each switch comprises two contact points and one contact arm; the first switch has one contact point connected with the positive terminal of the first power source and the fixed end of the contact arm connected with the positive terminal of the second power source; the second switch has one contact point connected with the positive terminal of the first power source, the other contact point connected with the negative terminal of the first power source and the common brush, and the fixed end of the contact arm connected with the negative terminal of the second power source; the third switch has one contact point connected to the low speed brush, the other contact point connected to the high speed brush, and the fixed end of the contact arm connected with the positive terminal of the second power source.

Alternatively, the first power source is connected between the common brush and the switching device and the second power source is connected between the switching device and the high speed brush, the switching device selectably connecting the first power source to the low speed brush for operating the motor in the low speed mode or connecting the first power source in series with the second power source between the common brush and the high speed brush to operate the motor in the high speed mode.

Advantages of embodiments of the present invention include that different brushes and corresponding combinations of the power sources or the resistors can be selected by the switching device so that the motor can operate in different speed modes, therefore the stage number of the following gearboxes can be decreased so that losses and cost on the gearboxes can be reduced.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

It should be understood that the power tool according to the present invention could be a drill, hammer, saw, planer, impact wrench, spanner or the like. To simplify the description, various embodiments of the present invention will be described using a portable, hand held, cordless, power drill as an example.

Figure 1:
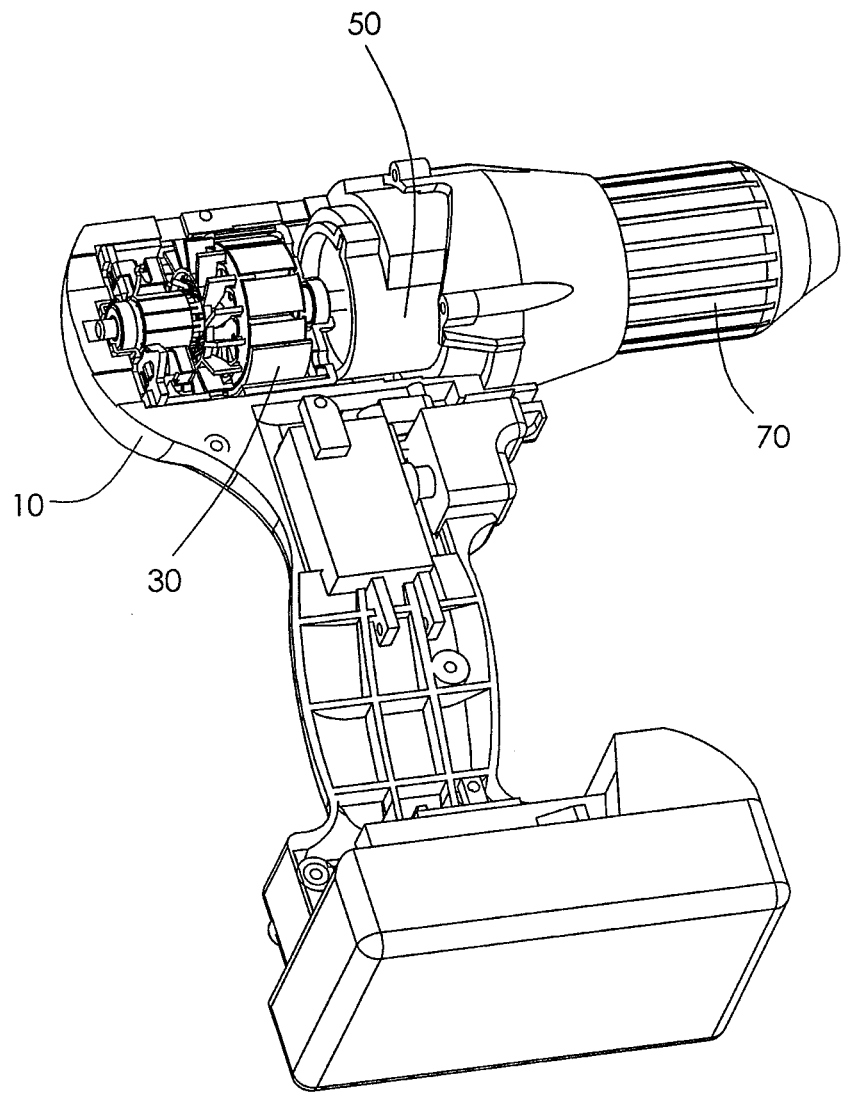
FIG. 1 shows a power tool in accordance with an embodiment of the present invention.

FIG. 1 illustrates a portable cordless drill with a portion of the casing cut away to show some of the parts inside. The drill comprises a housing 10, a motor 30 arranged in the housing 10, a speed reduction mechanism 50 in the form of a planetry gearbox, coupled to the shaft of the motor 30, and a drilling head or chuck 70 driven by the speed reduction mechanism 50.

Figure 2:
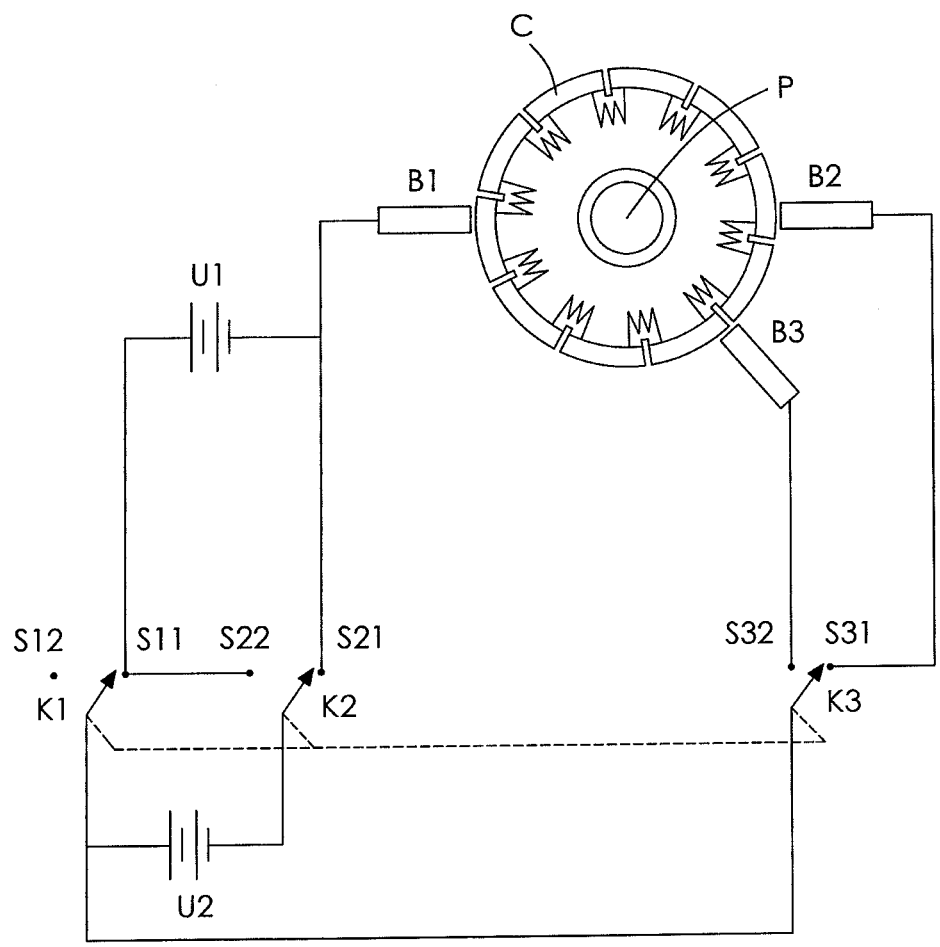
FIG. 2 shows a schematic connection arrangement of the commutator, brushes, power sources and switching device of a motor for the power tool of FIG. 1, in accordance with a first embodiment of the present invention.
Figure 3:
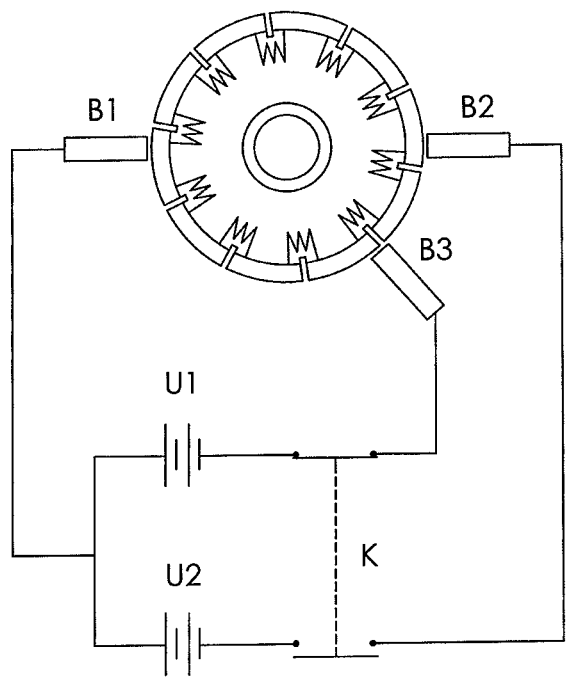
FIG. 3 shows a schematic connection arrangement, similar to FIG. 2, in accordance with a second embodiment of the present invention.

FIG. 2 schematically illustrates a direct current (DC) motor comprising a commutator C, a common brush B1, a low speed brush B2, a high speed brush B3, two DC power sources U1, U2, and a switching device. The brushes B1, B2, B3 are in sliding contact with the commutator C. The commutator C is attached to the motor shaft P and comprises a plurality of spaced-apart segments. Windings wound about a core of the rotor are connected to the segments. In this embodiment, voltages of the DC power sources U1, U2 are equal.

The switching device comprises three single pole double throw switches K1, K2, and K3. Each switch comprises two contact points and one contact arm with a fixed end and a free end arranged for selectively connecting with one of the two contact points. For the first switch K1, the first contact point S11 is connected with the positive terminal of the first power source U1, the second contact point S12 is left unconnected, and the fixed end of its contact arm is connected with the positive terminal of the second power source U2. For the second switch K2, the first contact point S21 is connected to a point between the negative terminal of the first power source U1 and the common brush B1, the second contact point S22 is connected to the positive terminal of the first power source U1, and the fixed end of its contact arm is connected to the negative terminal of the second power source U2. For the third switch K3 the first contact point S31 is connected to the low speed brush B2, the second contact point S32 is connected to the high speed brush B3, and the fixed end of the contact arm is connected with the positive terminal of the second power source U2. Contact arms of the three switches K1, K2, K3 are connected together via a connecting rod (shown by a broken line in FIG. 1). That is, selecting states of the free ends of the contact arms of the three switches can be changed by pushing the connecting rod.

When the free ends of the contact arms of the three switches K1, K2, K3 are connected with the first contact points S11, S21, S31 by pushing the connecting rod, the power sources U1, U2 will be connected in parallel, between the common brush B1 and the low speed brush B2 and the motor shaft P will rotate at low speed, i.e. the motor will operate in a low speed mode. When the free ends of the contact arms of the three switches K1, K2, K3 are connected with the second contact points S12, S22, S32 by pushing the connecting rod, the power sources U1, U2 will be connected in series between the common brush B1 and the high speed brush B3, and the motor shaft P will rotate at high speed, i.e., the motor will operate in a high speed mode to rotate the drill head at at a relatively high speed.

In the above embodiment, different brushes and corresponding combinations of the power sources can be selected by the switching device so that the motor can rotate in different speed modes, thus the number of stages of the gearbox of the speed reduction mechanism can be reduced to reduce the losses due to the gearbox.

Furthermore, effective work time of the motor can be increased by using the power sources U1, U2 connected in parallel when the motor is required to rotate at low speed. As an alternative arrangement, the three switches could be replaced by a single three pole double throw switch.

A second embodiment is shown in FIG. 2, in which the switching device is a linked switch K, such as a double pole, single throw switch, as shown, or a double pole, double throw switch. The common brush B1 is connected to the positive terminals of the power sources U1, U2, and the negative terminals of the power sources U1, U2 are respectively connected with the high speed brush B3 and the low speed brush B2 via contacts of the linked switch K. The linked switch K selectively connects the power source U1 with the high speed brush B3 so that the motor operates in a high speed mode to rotate the drilling head 70 at a relatively high speed, or connects the power source U2 with the low speed brush B2 so that the motor operates in a low speed mode to rotate the drilling head 70 at a relatively low speed. In this embodiment, the voltage of the power source U1 is preferably higher than the voltage of the power source U2.

Figure 4:
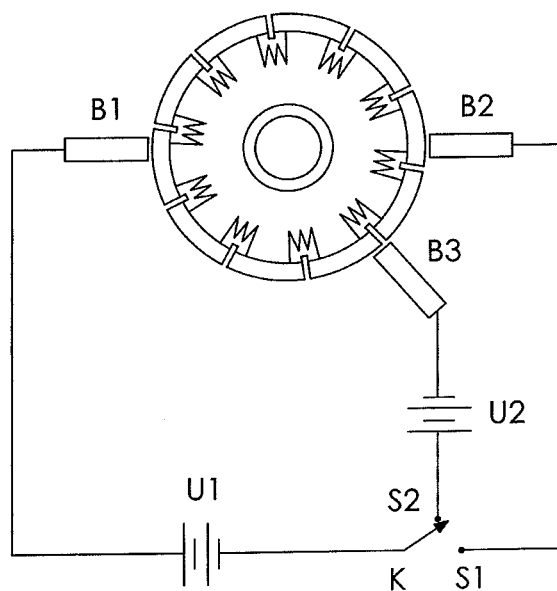
FIG. 4 shows a schematic connection arrangement, similar to FIG. 2, in accordance with a third embodiment of the present invention.

Referring to FIG. 4, it should be understood that switching device can also be a single pole double throw switch K. Contact point S1 of the switch K is connected to the low speed brush B2 and contact point S2 is connected to the positive terminal of the power source U2, and the fixed end of the contact arm of the switch K is connected with the negative terminal of the power source U1. When the free end of the contact arm of the switch K is connected to the contact point S1, the power source U1 will be connected with the low speed brush B2 and the motor will rotate in the low speed mode. When the free end of the contact arm of the switch K is connected to the contact point S2, the power source U1 will be connected with the power source U2 in series between the common brush B1 and the high speed brush B3, and the motor shaft will rotate at high speed.

Figure 5:
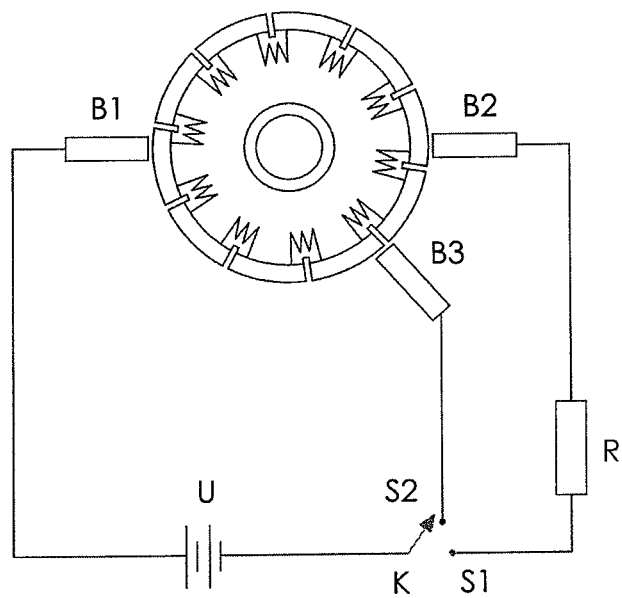
FIG. 5 shows a schematic connection arrangement, similar to FIG. 2, in accordance with a fourth embodiment of the present invention.

Referring to FIG. 5, it should be understood that the power tool can alternately comprise a single power supply U. A resistor R is connected in series between the low speed brush B2 and a first contact point S1 of a single pole double throw switch K. A second contact point S2 of the switch K is directly connected with the high speed brush B2. The fixed end of the contact arm of the switch K is connected with the negative terminal of the power source U. The voltage applied to the low speed brush B2 when the switch K is turned to S1 is less than the voltage applied to the high speed brush when Switch K is turned to S2 due to the voltage drop across the resistor R. Thus the motor will operate at a lower speed in the low speed mode than it would have without the resistor. Thus the power source U and the resistor R function as a second power source of lower voltage.

Figure 6:
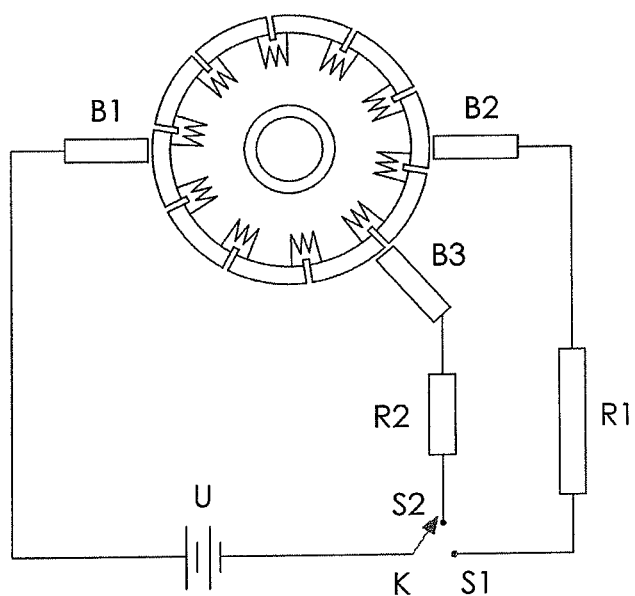
FIG. 6 shows a schematic connection arrangement, similar to FIG. 2, in accordance with a fifth embodiment of the present invention.

Alternately, as shown in FIG. 6, two resistors R1, R2 are respectively connected with the low speed brush B2 and the high speed brush B3. Resistance value of the resistor R1 is larger than the resistance value of the resistor R2. The switch K can selectively connect the power source U between the common brush B1 and the low speed brush B2 via resistor R1, or connect the power source U between the common brush B1 with the high speed brush B3 via resistor R2, so the motor operates in different speed modes.

Figure 7:
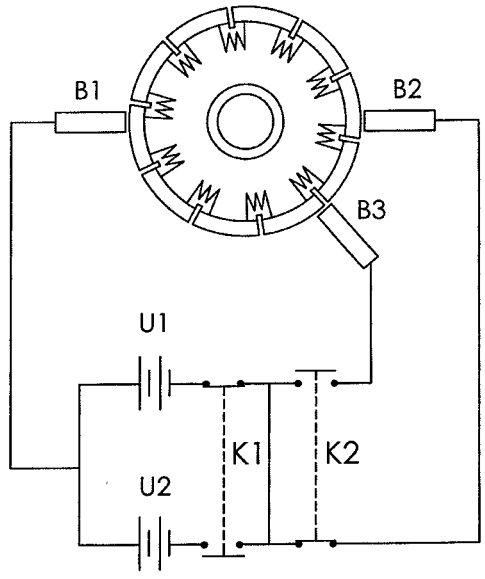
FIG. 7 shows a schematic connection arrangement, similar to FIG. 2, in accordance with a sixth embodiment of the present invention.

It should be understood that the switching device can also be a pair of linked switches K1, K2, as shown in FIG. 7. The voltages of the two power sources are not equal. Selectively connecting one of the power sources U1, U2 with one of the brushes B1, B2, B3, such as connecting U1 with B2, U2 with B2, U1 with B3, or U2 with B3 can be obtained through the cooperation of the pair of linked switches K1, K2, thereby the motor can be operated at more different speeds. In addition, when one of the power sources is depleted, the other power source can be used conveniently.

Figure 8:
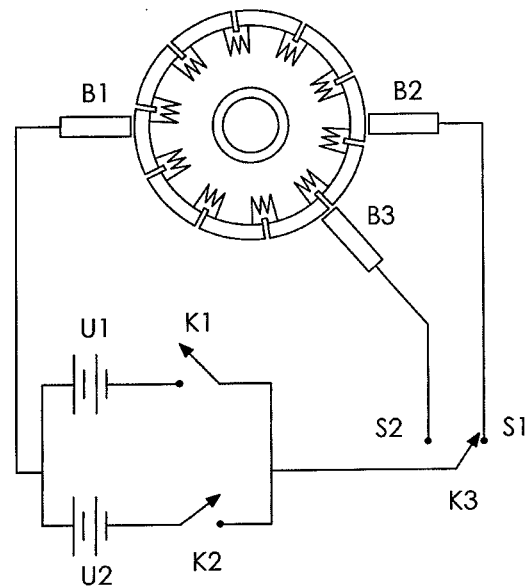
FIG. 8 shows a schematic connection arrangement, similar to FIG. 2, in accordance with a seventh embodiment of the present invention.

As shown in FIG. 8, the switching device can also be a pair of single pole single throw switches K1, K2 and a single pole double throw switch K3. The switches K1, K2 are connected between the negative terminals of the power sources U1, U2 and the fixed end of the contact arm of the switch K3 respectively. The contact point Si of the switch K3 is connected to the low speed brush B2 and the contact point S2 of the switch K3 is connected to the high speed brush B3, The positive terminals of the power sources U1, U2 are connected with the common brush B1. Selectively connecting one of power sources U1, U2 with one of the brushes B2, B3, such as connecting U1 with B2, U1 with B3, U2 with B2, or U2 with B3 can be obtained through the operation of the switches K1, K2, K3. In addition, both power sources can be connected in parallel to either selectable brush for additional power in that speed mode. This is particularly desirable for the low speed mode when additional torque is required.

Figure 9:
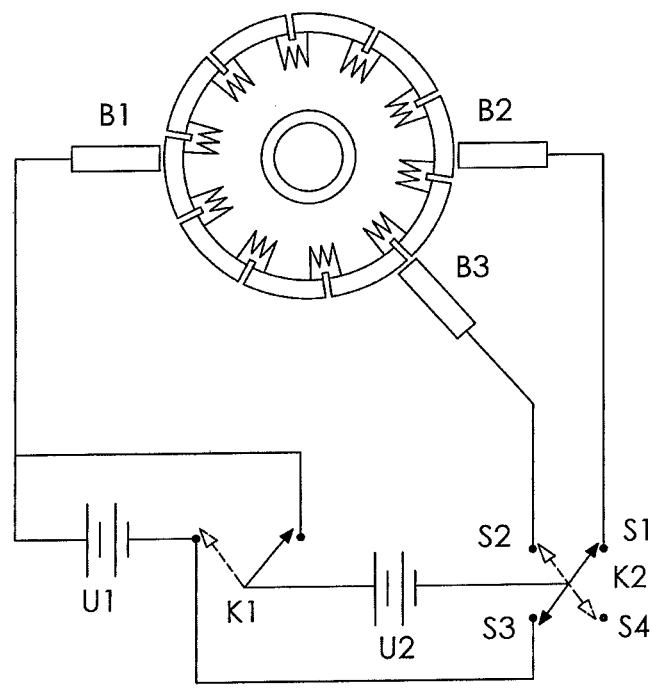
FIG. 9 shows a schematic connection arrangement, similar to FIG. 2, in accordance with a eighth embodiment of the present invention.

As shown in FIG. 9, the switching device can also be a single pole double throw switch K1 and a linked switch K2. The fixed end of the contact arm of the switch K1 is connected with the positive terminal of the power source U2, two contact points of the switch K1 are respectively connected with two terminals of the power source U1, the common brush B1 is connected with the positive terminal of the power source U1. The linked switch K2 comprises four contact points S1-S4 and a contact arm with a central terminal and two free ends for selectively connecting with two of the contact points S1-S4. The contact point Si is connected with the low speed brush B2, the contact point S2 is connected with the high speed brush B3 and the contact point S3 is connected with the negative terminal of the power source U1. The center terminal is connected with the negative terminal of the power source U2. Through operation of the switches K1, K2, selective connection of the power sources U1, U2 with the high speed brush B3 or connection of the power source U2 with the low speed brush B2 can be obtained to operate the motor in different predetermined speed modes. That is, low speed brush B2 can be connected to both power sources connected in parallel, while the high speed brush B3 can be connected to both power sources connected in series or to just power source U2 to provide two high speed modes of operation. If switch K1 has an open position then brush B2 could be connected to just power source U2 allowing the two power sources to have different voltages and thus not suitable to being connected in parallel.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the number of power sources can optionally be three or four or more and the number of brushes can optionally be four or more. By selecting different brushes and corresponding combinations of the power sources, the motor can operate in different speed modes so that the number of stages of the gearbox attached to the motor can be decreased, thus reducing the losses due to and cost of the gearbox.

The invention claimed is:

1. A power tool comprising: a housing, a direct current motor arranged in the housing, a speed reduction mechanism coupled to a shaft of the motor, a tool head driven by the speed reduction mechanism, a first direct current power source, a second direct current power source and a switching device,
   wherein the motor comprises: a common brush, a high speed brush and a low speed brush which are in sliding contact with a commutator; and
   wherein the switching device is configured to selectively connect the common brush and the high speed brush and the common brush and the low speed brush with predetermined combinations of the power sources to operate the motor in different speed modes.

2. The power tool of claim 1, wherein the switching device connects the first and second power sources in series between the common brush and the high speed brush to operate the motor in a high speed mode.

3. The power tool of claim 1, wherein the switching device connects the first and second power sources in parallel between the common brush and the low speed brush to operate the motor in a low speed mode.

4. The power tool of claim 1, wherein the first and second power sources have the same voltage.

5. The power tool of claim 1, wherein the first and second power sources have different voltages.

6. The power tool of claim 1, wherein the switching device comprises three single pole double throw switches and each switch comprises two contact points and one contact arm;
   the first switch has one contact point connected with the positive terminal of the first power source and the fixed end of the contact arm connected with the positive terminal of the second power source;
   the second switch has one contact point connected with the positive terminal of the first power source, the other contact point connected with the negative terminal of the first power source and the common brush, and the fixed end of the contact arm connected with the negative terminal of the second power source;
   the third switch has one contact point connected to the low speed brush, the other contact point connected to the high speed brush, and the fixed end of the contact arm connected with the positive terminal of the second power source.

7. The power tool of claim 2, wherein the first power source is connected between the common brush and the switching device and the second power source is connected between the switching device and the high speed brush, the switching device selectably connecting the first power source to the low speed brush for operating the motor in a low speed mode or connecting the first power source in series with the second power source between the common brush and the high speed brush to operate the motor in a high speed mode.

* * * * *